United States Patent Office 3,576,825
Patented Apr. 27, 1971

3,576,825
OXIDATION OF TETRAALKYL BENZENES TO PYROMELLITIC DIANHYDRIDE USING A NON-FUSED NIOBIUM VANADATE CATALYST
Richard I. Bergman, Princeton, N.J., assignor to Princeton Chemical Research, Inc., Princeton, N.J.
No Drawing. Continuation of application Ser. No. 468,618, June 30, 1965, and a continuation-in-part of application Ser. No. 385,801, July 28, 1964.
This application Mar. 19, 1969, Ser. No. 808,700
Int. Cl. C07c 63/02
U.S. Cl. 260—346.4        12 Claims

ABSTRACT OF THE DISCLOSURE

Improvements in the oxidation of tetraalkyl benzenes to pyromellitic dianhydride in the vapor phase with oxygen oxidant using as the catalyst for the reaction a calcined material made by drying, at up to about 550° C., a niobium vanadate catalyst formed by drying an oxalic acid solution of vanadium pentoxide and niobium vanadate. The preferred tetraalkyl benzene is durene.

---

This application is a continuation of application Ser. No. 468,618 filed June 30, 1965, now abandoned, and a continuation-in-part of application Ser. No. 385,801, filed July 28, 1964, now abondoned.

This invention relates to improvements in the oxidation of tetraalkyl benzenes, particularly durene, to pyromellitic dianhydride (PMDA). It more particularly refers to a novel improved catalyst for such oxidation reaction.

It is known that alkyl aromatic hydrocarbons may be catalytically oxidized by reaction of an oxygen-containing gas, such as air, at an elevated temperature in contact with an oxidation catalyst, such as a supported vanadium oxide catalyst. Where the alkyl aromatic hydrocarbon contains two adjacent alkyl substituents on the ring, which are preferably lower alkyl groups, the oxidation reaction results in a conversion to the anhydride. Where the alkyl aromatic hydrocarbon contains two groups of two adjacent alkyl substituents on the ring, the oxidation results in a conversion to the dianhydride.

It has been proposed to catalytically oxidize durene in this manner to form pyromellitic dianhydride. This catalytic oxidation process, however, has not proven commercially nor economically attractive and pyromellitic dianhydride is still produced by the expensive, technically difficult, and dangerous nitric acid oxidation process.

There is extensive published art on the oxidation of dialkyl benzenes and naphthalenes to produce phthalic anhydride. Some of this art even analogizes between phthalic anhydride production and pyromellitic anhydride production. For example, U.S. Pat. 3,300,516 discloses the use of a fused vanadium-niobium catalyst for oxidizing di lower alkyl benzenes to phthalic anhydride. It has been found, as a result of extensive testing, that such fused vanadium-niobium catalysts are unsuited to use in the catalytic vapor phase oxidation of durene and other similar tetraalkyl benzenes to pyromellitic dianhydride.

One object of this invention is an improved process for catalytically oxidizing alkyl aromatic hydrocarbons.

A further object of this invention is an improved and commercially more attractive and efficient process for catalytically oxidizing alkyl aromatic hydrocarbons to the corresponding anhydrides.

A still further object of the present invention is an improved and efficient process for catalytically oxidizing durene to pyromellitic dianhydride. These and still further objects will become apparent from the following description:

In accord with an fulfilling these objects it has been found that certain special niobium-vanadium catalysts are extremely effective in catalyzing the vapor phase oxygen oxidation of tetraalkyl benzenes, particularly durene, to pyromellitic dianhydride. The catalyst of this invention is to be distinguished from the catalyst of the above referred to Pat. 3,300,516 in that the catalyst of this reference is a fused catalyst, whereas the catalyst of this invention is calcined, that is heated to a friable state but not fused. Comparative data are set forth hereinafter showing the differences in the catalytic activity of these two materials.

In accordance with the invention it has been discovered that alkyl aromatic hydrocarbons may be catalytically oxidized with an oxygen-containing gas in a more efficient manner and with a higher yield if the oxidation is effected utilizing a vanadium catalyst containing niobium. The ratio of niobium to vanadium in the catalyst may vary between 0.05 and 1 gram atom niobium per gram atom of vanadium and is preferably between about 0.1 and 0.3 gram atom niobium per gram atom of vanadium.

The catalyst may be of any known or conventional solid form, such as pellets, granules, extrudates, preferably on a solid support of a carrier material, such as alumina, silicon carbide, magnesium oxide, or any other known or conventional carrier material. Where a carrier material is used, the same is preferably present in amounts of 99 to 75 and most preferably 95 to 85 weight percent for the total catalyst. The catalyst is preferably used in the form of a fixed bed, and for this purpose has a particle size ranging from $\frac{1}{16}''$ to $\frac{1}{2}''$ and preferably $\frac{1}{8}''$ to $\frac{1}{4}''$.

The catalyst may also be prepared in finely divided form for fluid bed operation. Particle diameter distribution would be, for example, in the range of 10 to 400 microns.

The preferred catalysts used in accordance with the invention are formed by drying a solution containing the vanadium and niobium component or drying such a solution in the presence of the carrier. Thus, for example, the required amounts of the vanadium in the form of vanadium pentoxide and the niobium in the form of niobium oxalate, may be dissolved in an oxalic acid solution. Solid pellets of the carrier, as for example pure alpha-alumina or silicon carbide, or any other carrier are then added to the oxalic acid solution, and the resulting mixture heated and tumbled to dryness whereby the vanadium-niobium catalyst coats the carrier pellets, which may be then calcined in air at a temperature, as for example, between 300–550° C. Alternately, the oxalic acid solution may be heated to dryness in the absence of the carrier and resulting catalytic solids may be then ground and pelleted and used as such, or admixed with the carrier material before pelleting. The carrier material in either case is preferably one having a low inner surface area.

Promoting components such as the alkali metals and alkaline earth metal oxides, sulfates, or phosphates, boron, silver, manganese or phosphorus, antimony, or arsenic may be added as soluble materials to the vanadium-niobium oxalate mixture. The amount of promoting component will vary between .1 and 5% of the amount of niobium plus vanadium in the catalyst. The relative amounts of the niobium to the vanadium may vary so that in the catalyst the gram atom ratio of Nb/V varies between 0.05 and 1, and preferably between 0.1 and 0.3.

The exact nature and the structure of the catalyst formed in this manner is not known, but it is believed that the same may constitute an inorganic polymer containing the vanadium and niobium. Without being restricted to any specific form or structure, a catalyst formed in this manner is referred to herein and in the claims as a niobium vanadate.

The starting alkyl aromatic hydrocarbons may be any of the known alkyl aromatic hydrocarbons, which may be catalytically oxidized. A preferred group of alkyl aromatic hydrocarbons are tetraalkyl benzenes containing lower alkyl radicals. The catalytic oxidation of these results in the formation of the corresponding acid anhydrides. The alkyl aromatic hydrocarbons preferably have pairs of alkyl substituents on adjacent carbon atoms of the ring, these most preferably being lower alkyl radicals, such as methyl radicals.

Examples of starting alkyl aromatic hydrocarbons which may be oxidized in accordance with the invention include o-xylene, durene, octahydroanthracene, tetraethyl or tetrapropyl benzene, ethyl trimethyl benzene, diethyl dimethyl benzene, propyl trimethyl benzene, and in general compounds of the formula

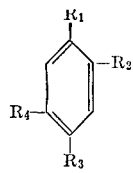

where $R_1$, $R_2$, $R_3$, and $R_4$ may be methyl, ethyl or propyl groups. Octahydrophenanthrene, anthracene and phenanthrene may be also be oxidized according to this invention.

The preferred starting alkyl hydrocarbon is durene in order to prepare pyromellitic dianhydride. Octahydroanthracene may also be used for this purpose.

A mixture of the starting alkyl aromatic hydrocarbon, such as the durene and the oxygen-containing gas is passed over the catalyst while maintaining the temperature between 400–60° C., and preferably between 400–500° C., and most preferably at a temperature in this range substantially below 500° C. Reduced, normal, or elevated pressure may be used for the reaction and thus, for example, pressure ranges between about 0.5 and 30 atmospheres, and preferably between 1–5 atmospheres may be used. The contact time of the gas stream with the catalyst may vary between 0.01 and 2 seconds depending on the temperature and pressure.

Air is preferably used as the oxygen-containing gas but it is possible to use a mixture of oxygen and any other diluent, such as steam, nitrogen, or carbon dioxide. The hydrocarbon feed, such as the durene, should be present in amount of about 0.01 to 1.5 mol percent in the gas stream.

The reaction may be effected in any known or conventional reactor for contacting a gas and a catalyst which is provided with a suitable temperature control. Thus, the reaction may be effected with the catalyst in a simple reaction tube or chamber, in a tube reactor, or the like with a circulating heat transfer fluid, such as a liquid, to maintain the temperature control.

The reaction product may be recovered in any known or conventional manner, as for example by condensation, solvents, scrubbing or the like, and may be purified in the conventional manner.

As for example, pyromellitic dianhydride may be recovered by direct condensation, as for example in a condenser maintained at a temperature between 20 and 350° C. The pyromellitic dianhydride may be then removed from the condenser by scraping or the like and dissolved in an organic solvent, as for example p-dioxane, diacetone alcohol, cellusolve acetate, diphenylether, 1,2-dimethoxyethane, various ketones or the like, the solvent solution decolorized with activated charcoal, the charcoal removed, the pyromellitic dianhydride recrystallized by cooling, removed by centrifuging, filtering or the like. The solvent may, of course, be recovered and recycled. Alternately, the solvent may be used to directly remove the condensed pyromellitic dianhydride from the condenser by passing the solvent directly through the condenser. For continuous operation it is desirable to have two or more alternately operated condensers.

Alternately, the crude pyromellitic dianhydride may be recovered by water scrubbing at a temperature between about 90–300° F. The water-insoluble products are removed by filtration or centrifuging and the water solution is decolorized with charcoal. The carcoal is removed and the solution is allowed to cool to recrystallize the pyromelitic acid, which is then recovered by centrifuging, dehydrated and the resulting crude pyromellitic dianhydride may be further purified by recrystallization as described above.

An alternate, preferred mode of recovering the reaction products, such as the pyromellitic dianhydride (PMDA) from the reaction gases is to cool the tail gases from the reactor to below the solidification point of the PMDA and to catch and recover the solid PMDA particles thus formed on a screen of filter cloth.

The following examples are given by way of illustration and not limitation:

EXAMPLE 1

A niobium vanadate containing catalyst of 0.18 Nb/V atom ratio was prepared supported on alumina in the following manner: 60 g. of $V_2O_5$ was carefully dissolved in 149 g. oxalic acid in water at about 50° C. A solution of 63.4 g. of niobium oxalate in water was added slowly to the vanadium oxalate solution. 150 g. of acid leached and dried Alundum were added, and the mixture evaporated to dryness with tumbling. The supported catalyst was calcined for 1 hour at 500° C. This catalyst was used to oxidize durene to pyromellitic dianhydride. 50 ml. of catalyst were charged to a ¾″ I.D. reactor tube containing an axial thermowell. 70 ml. of uncoated Alundum were placed above the catalyst to act as a preheat zone.

6.0 ml./hr. of durene and 542 l./hr. air were passed over the catalyst. The following yield data were obtained:

| Temperature: | Weight percent pyromellitic dianhydride (PMDA) |
|---|---|
| 450 | 89 |
| 500 | 101 |

EXAMPLE 2

A catalyst with the same Nb/V ratio as the catalyst of Example 1 was prepared in a similar manner except that it was supported on SiC. Equivalent yields were obtained when the catalyst was tested in the same manner.

EXAMPLE 3

A catalyst with the same Nb/V ratio as the catalyst of Example 1 was prepared in a similar manner except that no support was used. The catalytic solids were ground and pelleted and tested in the same manner. Equivalent yields of PMDA were obtained.

EXAMPLE 4

Example 1 was repeated with catalyst with Nb/V ratios varying between 0.1 and 1.0. The results obtained are given in the table below:

| Nb/V ratio | T., °C. | Wt. percent PMDA |
|---|---|---|
| 0.1 | 500 | 101 |
| 0.18 | 500 | 101 |
| 0.36 | 500 | 89 |
| 1.0 | 525 | 50 |

EXAMPLE 5

Crude PMDA obtained with the catalyst of Example 1 was obtained by direct condensation from the reactor tail gas. 5.0 gm. was dissolved in 60 gm. p-dioxane at reflux. The hot solution was treated with 0.5 g. charcoal, and the charcoal removed by filtration. The solution was allowed to cool and white crystals recovered. The crystals were vacuum dried to 4.1 gm. of PMDA analyzing better than 99% purity by neutralization equivalent and vapor phase chromatography.

EXAMPLE 6

Crude PMDA was obtained with the catalyst of Example 1 as follows. Reactor tail gases were scrubbed with hot water to produce a dark yellow solution. Insoluble products were filtered off, and the hot solution treated with charcoal, filtered hot, and allowed to cool. Crude pyromellitic acid was recovered by filtration, dried, and found to be 96% pure by neutralization equivalent. The crude acid was dehydrated under vacuum at temperatures of 150–250° C. Charred looking areas were present in the crude anhydride. The crude anhydride was recrystallized from p-dioxane, producing a light colored product which was determined to be essentially pure PMDA. Recrystallization of crude anhydride from methyl isobutyl ketone also produced a substantially pure product.

EXAMPLE 7

O-xylene is oxidized to phthalic anhydride over the catalysts of Example 1. The reaction temperatures are 400–600° C. with 425–525° C. being preferred. Contact times are 0.01 to 20 sec., pressures from 0.5 to 30 atm. with 1–5 atm. being preferred. The mol concentration of O-xylene in air or in a mixture of oxygen plus inert gas, such as nitrogen, steam or $CO_2$, is 0.1 to 1.5 mol percent. The phthalic anhydride is recovered by direct condensation from air on chilled surfaces, or by scrubbing in water followed by evaporation and dehydration.

EXAMPLE 8

The catalyst described in Example 2 was used to oxidize o-xylene to phthalic anhydride. The reaction was carried out in a 3/4" I.D. steel reactor enclosed in a brass block and containing an axial thermowell. The product was recovered by direct condensation from the tail gas, and also by water scrubbing. Analysis of the product was carried out by gas chromatography and by pH titration. The following yield data were obtained:

| Volume gas feed per volume catalyst/hr. | Yield of PA, wt. percent | | |
|---|---|---|---|
| | 400° C. | 450° C. | 500° C. |
| 3,000 | 66 | 98 | 91 |
| 12,000 | 14 | 74 | 94 |

EXAMPLE 9

Following the procedure of Example 8, supported catalysts with Nb/V atom ratios up to 1 were prepared and tested. The highest yields are indicated below:

Nb/V atom ratio:     Wt. percent phthalic anhydride
 0.1 _____ 94
 0.25 _____ 98
 0.50 _____ 75
 1.0 _____ 66

EXAMPLE 10

50 ml. of a niobium vanadate catalyst with the atom ratio Nb/V=0.25, prepared as in Example 2, was mixed with 70 ml. of silicon carbide pellets and charged to a 0.9" I.D. reactor containing a thermowell. The reactor tube was jacketed and reaction temperature maintained by using a heat transfer medium. At an air flow rate of 9,500 volumes/hr./volume of catalyst 0.28 mol percent durene concentration and 785° F. average bed temperature, a 91 wt. percent yield was obtained.

EXAMPLE 11

600 ml. of a 0.25 Nb/V catalyst supported on SiC were charged to a 1" I.D. reactor 5 ft. long. The reactor was jacketed and reaction temperature maintained by a circulating eutectic salt mixture. Durene in 0.24–0.35 mol percent concentration in air was oxidized to PMDA. The PMDA product was recovered from the reactor tail gas by cooling the gas and then catching the solid PMDA particles on a filter cloth. At 740° F. average bed temperature and 4000 volumes/hr. per volume of catalyst air flow rate, 55 weight percent PMDA was obtained. At 770° F. average bed temperature (812° F. hot spot) and an air flow rate of 6000 volumes/hr./volume of catalyst a 72 wt. percent yield was obtained. At 780° F. average bed temperature (843° F. hot spot) and an air flow rate of 20,000 volumes/hr./volume of catalyst a 69 wt. percent yield was obtained.

EXAMPLE 12

A niobium vanadate containing catalyst of 0.25 Nb/V ratio is prepared supported on silicon carbide pellets in the following manner: 30 g. of $V_2O_5$ is carefully dissolved in 74.6 g. of oxalic acid in water at about 50° C. A solution of 27.8 g. of niobium oxalate in water is added slowly to the vanadium oxalate solution, 300 g. of silicon carbide pellets are added, and the mixture evaporated to dryness with tumbling. The supported catalyst is calcined for 1 hour at 500° C.

50 ml. of the catalyst are charged to a 3/4" I.D. reactor tube containing an axial thermowell. 70 ml. of uncoated silicon carbide pellets are placed above the catalyst to act as a preheat zone. Octahydroanthracene is passed over the catalyst at 0.1 mol percent concentration in air at 450° C. Contact time is 0.5 second. A 60 wt. percent yield of pyromellitic dianhydride (PMDA) is obtained by direct condensation of solids.

EXAMPLE 13

Octahydrophenanthrene is oxidized to the anhydride of 1,2,3,4-benzene tetra carboxylic acid, using the conditions of Example 12. A 54 wt. percent yield is obtained.

EXAMPLE 14

At the conditions of Example 12, 1,1-bis (3,4 dimethylphenyl) ethane is oxidized to 3,3',4,4'-benzophenone tetra carboxylic dianhydride in 62 wt. percent yield.

EXAMPLES 15–25

In these examples the catalyst was identical except for the temperature at which it was treated. In Examples 15–19 the catalyst was fused at 850° C. for 4 hrs. In Examples 20–25 the catalyst was calcined at 500° C. for 1 hr. In each case the catalyst was prepared identically, except as noted, to have a vanadium/niobium ratio of 7:1 and an Alundum substrate with 10% active catalyst content. The reactions were carried out under identical operating parameters with the reaction mixture of air and durene containing 0.376 mol percent durene and the contact time being 0.85 second. The reaction temperatures are set forth in the following table:

| Example No. | Hot spot Temp., ° C. | PMDA yield |
|---|---|---|
| 15 | 340 | 0 |
| 16 | 404 | 0 |
| 17 | 433 | 0 |
| 18 | 518 | 0 |
| 19 | 569 | 0 |
| 20 | 309 | 0 |
| 21 | 362 | 3.31 |
| 22 | 410 | 28.5 |
| 23 | 431 | 34.87 |
| 24 | 442 | 35.52 |
| 25 | 443 | 36.53 |

What is claimed is:
1. In the process for catalytically oxidizing a 1,2,4,5 tetraalkyl benzene to pyromellitic dianhydride in the vapor phase in the presence of an oxygen-containing gas and in contact with an oxidation catalyst, improvement which comprises utilizing as the oxidation catalyst a material prepare by calcining at up to 550° C. a niobium vanadate catalyst formed by drying an oxalic acid solution of vanadium pentoxide and niobium oxalate.

2. Process claimed in claim 1, wherein said tetraalkyl benzene is durene.

3. Improvement according to claim 1 in which said catalyst contains said niobium in amount of .05 to 1 gram atom of niobium per gram atom of vanadium.

4. Improvement according to claim 3 in which said catalyst is supported on an inert carrier.

5. Improvement according to claim 1 in which said catalyst contains said niobium in amount of from about 0.05 to 1 gram atom of niobium per gram atom of vanadium.

6. Improvement according to claim 1 in which said oxygen-containing gas is air.

7. Process according to claim 1 in which said niobium vanadate catalyst contains from about 0.1 to 0.3 gram atom of niobium per gram atom of vanadium.

8. Process according to claim 4 in which said carrier is silicon carbide.

9. Process according to claim 1 in which said pyromellitic dianhydride is recovered by cooling the reaction gas stream to a temperature below the solidification temperature of pyromellitic dianhydride and recovering solid particles thereof from the gas stream on a solid gas permeable surface.

10. Process according to claim 1 in which said pyromellitic dianhydride is recovered by scrubbing the reaction gas stream with water.

11. Process according to claim 1 in which said niobium vanadate catalyst is supported on a carrier selected from the group consisting of silicon carbide and alumina and contains from 0.1 to 0.3 gram atom of niobium per gram atom of vanadium, and in which said gas stream is air containing about 0.01 to 1.5 mol percent of durene and in which said contacting with the catalyst is effected at a pressure between 0.5 and 30 atmospheres at a temperature below 500° C. for a period of time between 0.01 and 2 seconds.

12. Process claimed in claim 1, wherein said tetraalkyl benzene is octahydroanthracene.

References Cited

UNITED STATES PATENTS 3,300,516   1/1967   Vrbaski   260—346.4

ALEX MAZEL, Primary Examiner

B. I. DENTZ, Assistant Examiner

U.S. Cl. X.R.

252—461